Patented Apr. 5, 1932

1,852,713

UNITED STATES PATENT OFFICE

JAMES H. GILL, OF STEUBENVILLE, OHIO

REFRACTORY

No Drawing.     Application filed October 17, 1929.   Serial No. 400,449.

This invention relates to a refractory composition and more particularly to the refractory composition particularly adapted for the manufacture of radiant clay products, such as baffles, long rectangular radiants, and small radiants that reflect and radiate the heat.

One object of this invention is the perfection of an improved composition whereby refractory radiant glower products may be made having great toughness and tensile strength combined with properties of radiating heat and withstanding great thermal shocks and temperature variations.

Other objects of the invention will be made apparent in the detailed description of the invention.

The invention broadly consists in a mixture of certain refractory clays and other mineral deposits which, when sufficient water is added, make a semi-plastic mixture which is adapted to be molded into the desired shape or contour and which, after being dried to remove excess moisture, is then fired or burned in a kiln, and thereby formed into a strong and durable refractory radiant article capable of withstanding for long-time varying intervals of high and low temperatures without cracking or spalling.

My improved composition consists of a mixture of clays and mineral oxids. Various clays may be used but the preferred clay is one either having or approximating the following typical analysis:

| | Per cent |
|---|---|
| Silica | 45.60 |
| Alumina | 35.90 |
| Titanium oxid | 1.00 |
| Iron oxid | 1.00 |
| Calcium oxid | .10 |
| Magnesium oxid | .30 |
| Potassium oxid | .72 |
| Sodium oxid | .46 |
| Ignition loss | 14.60 |

Fusion point cone 32 or 33 and of a white close burning nature.

The following composition has been used to advantage in making radiants:

| | Per cent |
|---|---|
| Hard wood sawdust | 15 to 25 |
| Fused alumina or electric corundum | 15 to 25 |
| Clays | 30 to 60 |
| Talc | 10 to 20 |

In the preparation of my improved composition, the several materials will first be ground, either wet or dry, to the desired degree of fineness. The materials, in the proper proportions, will then be thoroughly mixed. Enough water will be added, either before or during the mixing operation, to form a semi-plastic mass of the right consistency for molding. The semi-plastic mixture is then molded into the desired shapes and the so-formed shapes are then dried either by exposure to the atmosphere or in kilns. After the shapes are dried and excess moisture thereby removed, the dried shapes are fired or burned at a temperature up to and including 1200 degrees centigrade in the usual known manner.

The burned shapes are then in readiness for the particular use for which they are intended.

The advantages of my invention, which will be appreciated by those skilled in the art, arise from the use of sawdust, fused alumina or electric corundum and talc with semi-plastic clays. This composition enables radiants and similar structures being formed to have great strength and increased heat resistance, and a minimum amount of shrinkage when burning the shapes.

Modifications in the amount of the various materials used in making my improved composition may be made within the scope of the appended claim.

I claim:

The raw batch for a refractory material containing approximately 30 to 60 per cent. semi-plastic clays, approximately 15 to 25 per cent. hard wood saw-dust, approximately 15 to 25 per cent. fused alumina and approximately 10 to 20 per cent. talc.

In testimony whereof, I have hereunto set my hand.

JAMES H. GILL.